(12) United States Patent
Kobayashi

(10) Patent No.: US 7,483,728 B2
(45) Date of Patent: Jan. 27, 2009

(54) PORTABLE COMMUNICATION UNIT AND INTERNAL ANTENNA USED FOR SAME

(75) Inventor: Takeshi Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 77 days.

(21) Appl. No.: 11/484,385

(22) Filed: Jul. 11, 2006

(65) Prior Publication Data

US 2006/0250312 A1 Nov. 9, 2006

Related U.S. Application Data

(63) Continuation of application No. 09/923,730, filed on Aug. 7, 2001, now abandoned.

(30) Foreign Application Priority Data

Aug. 17, 2000 (JP) .............................. 2000-247243

(51) Int. Cl.
*H04M 1/00* (2006.01)

(52) U.S. Cl. .............. 455/575.5; 455/575.6; 455/575.7; 343/702; 343/700 MS; 340/572.4

(58) Field of Classification Search .............. 340/572.4; 343/702, 700 MS, 713, 818, 895; 455/575.5–575.7
See application file for complete search history.

(56) References Cited

U.S. PATENT DOCUMENTS

| | | | |
|---|---|---|---|
| 4,721,962 A | 1/1988 | Gorzel | |
| 5,828,339 A | 10/1998 | Patel | |
| 5,952,975 A * | 9/1999 | Pedersen et al. | 343/702 |
| 6,091,363 A | 7/2000 | Komatsu et al. | |
| 6,095,820 A | 8/2000 | Luxon et al. | |
| 6,154,137 A * | 11/2000 | Goff et al. | 340/572.4 |
| 6,297,776 B1 | 10/2001 | Pankinaho | |
| 6,326,922 B1 | 12/2001 | Hegendoerfer | |
| 6,327,495 B1 | 12/2001 | Iwabuchi et al. | |
| 6,400,326 B1 * | 6/2002 | Green, Jr. | 343/713 |
| 6,509,882 B2 * | 1/2003 | McKivergan | 343/818 |

FOREIGN PATENT DOCUMENTS

| | | |
|---|---|---|
| CN | 1124066 | 6/1996 |
| CN | 1124067 | 6/1996 |
| CN | 1255784 | 6/2000 |
| EP | 0522538 | 1/1993 |
| EP | 0648023 | 12/1995 |
| EP | 0707355 | 4/1996 |

(Continued)

*Primary Examiner*—MD S Elahee
(74) *Attorney, Agent, or Firm*—Michael Best & Friedrich LLP

(57) ABSTRACT

A rear case and a front case are unified to form a casing. An internal antenna is accommodated in a predetermined space in the rear case, and supported in a state that it is inserted between the rear case and a printed circuit board. An output end of an antenna metal element is connected with a feeding point of the internal antenna, and an input end thereof is connected with a feeding terminal of the printed circuit board via a contacting means. Accordingly, there is no necessity for soldering the antenna metal element to the feeding terminal of the printed circuit board, the number of structural elements can be reduced, and the fabricating process can be simplified.

12 Claims, 4 Drawing Sheets

FOREIGN PATENT DOCUMENTS

| | | |
|---|---|---|
| EP | 1001486 | 5/2000 |
| EP | 1052723 | 11/2000 |
| JP | 4-291502 | 10/1992 |
| JP | 5-22184 | 1/1993 |
| JP | 5-299929 | 11/1993 |
| JP | 8-265026 | 10/1996 |
| JP | 9-8526 | 1/1997 |
| JP | 9-27711 | 1/1997 |
| JP | 9-321529 | 12/1997 |
| JP | 11-177327 | 7/1999 |
| WO | WO 97/44856 | 11/1998 |
| WO | WO 98/54784 | 12/1998 |

* cited by examiner

PORTABLE COMMUNICATION UNIT AND INTERNAL ANTENNA USED FOR SAME

This application is a continuation of U.S. patent application Ser. No. 09/923,730, filed Aug. 7, 2001, which claims priority of Japanese Patent Application No. 2003-409204, filed Dec. 8, 2003.

FIELD OF THE INVENTION

The invention relates to a portable communication unit and an internal antenna used for the same, and especially to a portable communication unit and an internal antenna used for the same in which a feeding system of an internal antenna is simplified and a space for accommodating an internal antenna is saved.

BACKGROUND OF THE INVENTION

In a fabricating technology of a portable communication unit, such as a cellular phone or a personal handyphone system, researches for decreasing sizes and weights of parts including batteries, casings, antennas, and electronic circuits to the utmost limits and for reducing consumed electric power are actively developed in order to realize a compactness and lightweight of the portable communication unit. Referring to the antenna, an inverted F shaped antenna or a chip dielectric antenna is adopted in order to save a space for accommodation it. As shown in Japanese Patent Applications, Laid-Open, No. 9-321529, the internal antenna is electrically connected with the printed circuit board on which a display, a key unit, and the electronic circuits are mounted via a feeding system composed of two leaf springs (a feeding spring and a grounding spring) in the conventional portable communication unit.

However, in the feeding system using the leaf springs, since distances between the surface of the printed circuit board and the feeding points of the internal antenna are large, it becomes necessary to increase strokes of metal elements surving as the leaf springs. Accordingly, feeding terminals of the feeding system become large in order to secure sufficient spring-pressures, and areas of lands for soldering the metal elements of the feeding system to the printed circuit board become large. Moreover, the feeding system using the leaf springs is apt to interfere with peripheral structural elements, hence the efficiency of the antenna is apt to be lowered, and the characteristic of the antenna is apt to be fluctuated.

An internal antenna including a feeding system which improves the efficiency and the accuracy in the assembling process and stabilizes the characteristics of the internal antenna by simplifying its structure is disclosed in Japanese patent Applications, Laid-Open, No. 9-8526.

FIG. 1 shows the structure of the internal antenna 100 mentioned in the above.

The internal antenna 100 is provided with a chassis 102 which is formed above a diectical plate 101. Soldering patterns 103*a*, 103*b*, 103*c* are formed on the chassis 102, on which a matching circuit (not shown) is set and soldered to the soldering patterns 103*a* to 103*c*. The internal antenna 100 is fixed to the shield case (not shown) by soldering. The shield case is molded out of thermoplastic, and a whole outer surface thereof is plated with metal. The shield case is lightweight and shields electronic circuits (not shown) accommodated therein electromagnetically. Moreover, ribs (not shown) fitting conducting elements 105*a* to 105*d* which are formed on a grounding pattern 104 are provided for the top surface of the shield case. Moreover, a radiator 106 is formed on a top surface of the internal antenna 100.

Since a position of the internal antenna 100 relative to the shield case can be easily determined and the internal antenna 100 is connected with the shield case electrically and mechanically, the accuracy in the assembling process is heightened, and the characteristic of the internal antenna is stabilized. Moreover, since the grounding pattern 104 is electrically connected with the plated metal layer on the top surface of the shield case via the conductive elements 105*a* to 105*d*, and the plated metal layer serves as the grounding plane of the internal antenna 100, metal elements situated under a bottom surface of the dielectric plate 101 which are used in the conventional internal antenna become unnecessary, and the number of the structural elements can be reduced.

However, in the conventional portable communication unit, it is a premise that the internal antenna 100 is positioned on the top surface of the shield case. Moreover, since the grounding pattern 104 of the internal antenna 100 is soldered to the top surface of the shield case which is plated with metal, soldering technique becomes necessary in a fabrication process of the internal antenna 100. Furthermore, since it is necessary to combined the internal antenna with the shield case, the position on which the internal antenna is to be situated is limited.

SUMMARY OF THE INVENTION

Accordingly, it is an object of the invention to provide a portable communication unit and an internal antenna used for the same in which a space for accommodating an internal antenna is saved without deteriorating a characteristic of an internal antenna, soldering technique becomes unnecessary in a fabrication process of an internal antenna, and the number of structural elements of an internal antenna can be reduced.

According to the first feature of the invention, a portable communication unit comprises:

a printed circuit board on which a radio unit composed of a transmitter and a receiver is mounted, an internal antenna which is classified into an inverted F shaped antenna or a dielectric antenna, an antenna metal element which is connected with a feeding point of the internal antenna at an output end thereof, and brought into contact with a feeding terminal formed on the printed circuit board at an input end thereof, a front case which is provided with a data-inputting key, an information-displaying means, a speaker, and a microphone, and a rear case which is provided with a space for accommodating the internal antenna, and fitted to the front case to form a casing, wherein the internal antenna is supported between the rear case and the printed circuit board.

According to the aforementioned structure, the internal antenna is accommodated in a predetermined space provided in the rear case, and inserted between the rear case and the printed circuit board. In this case, the internal antenna is brought into contact with the feeding terminal of the printed circuit board via the antenna metal element. That is to say, an electrical conduction between the internal antenna and the printed circuit board is secured by pressure exerted on a contact surface between these structural elements. Accordingly, since the internal antenna can be assembled without using soldering technique, the feeding system using the leaf springs becomes unnecessary. The space for accommodating the internal antenna can be reduced, and the number of the structural elements of the internal antenna can be decreased.

According to the second feature of the invention, an internal antenna of a portable communication unit which is accommodated in a casing composed of a front case and a rear case together with a printed circuit board, comprises:

a radiator situated inside the rear case, an antenna metal element which is connected with the radiator at an output end thereof, and brought into contact with a feeding terminal formed on the printed circuit board at an input end thereof, a reflecting plane which is situated opposited to the radiator maintaining a predetermined interval therebetween, a conductive painting which is applied to an inner surface of the rear case and brought into contact with a grounding pattern of the printed circuit board, and connecting terminals which connect an edge of the referencing plane with the conductive painting via contacting means.

According to the aforementioned structure, the antenna metal element is connected with the radiator at an output end thereof, and brought into contact with the feeding terminal of the printed circuit board at an input end thereof. Moreover, the connecting terminal connects the edge of the reflecting plane opposite the radiator with the grounding pattern of the printed circuit board via contacting means. Accordingly, a soldering technique becomes unnecessary, a space for accommodating the internal antenna and accessories thereof can be saved, and the number of the structural elements can be reduced. Since the reflecting plane not only reflects an electric wave radiated from the radiator but also serves as a part of the grounding plane, a stable grounding plane can be secured, the deterioration of the efficiency of the antenna and the fluctuation of the characteristic of the antenna can be suppressed. Moreover, since the electrical conductions between the antenna metal element and the feeding terminal of the printed circuit board and between the connecting terminal and the conductive painting are secured by pressures exerted on contact surfaces between these structural elements, the soldering technique become unnecessary, and the fabrication process can be simplified.

BRIEF DESCRIPTION OF THE DRAWINGS

The invention will be explained in more detail in conjunction with appended drawings, wherein.

DESCRIPTION OF THE PREFERRED EMBODIMENTS

Hereafter, preferred embodiments of the invention will be explained preferring to the appended drawings.

The First Preferred Embodiment

Figure 1:
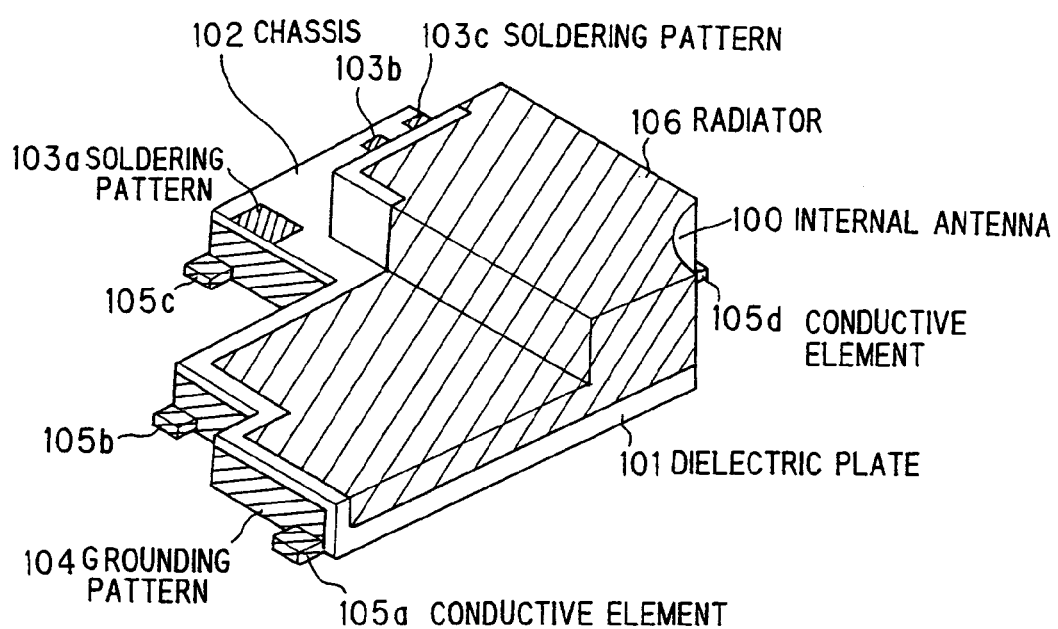
FIG. 1 is a perspective view for showing a structure of a conventional internal antenna.
Figure 2:
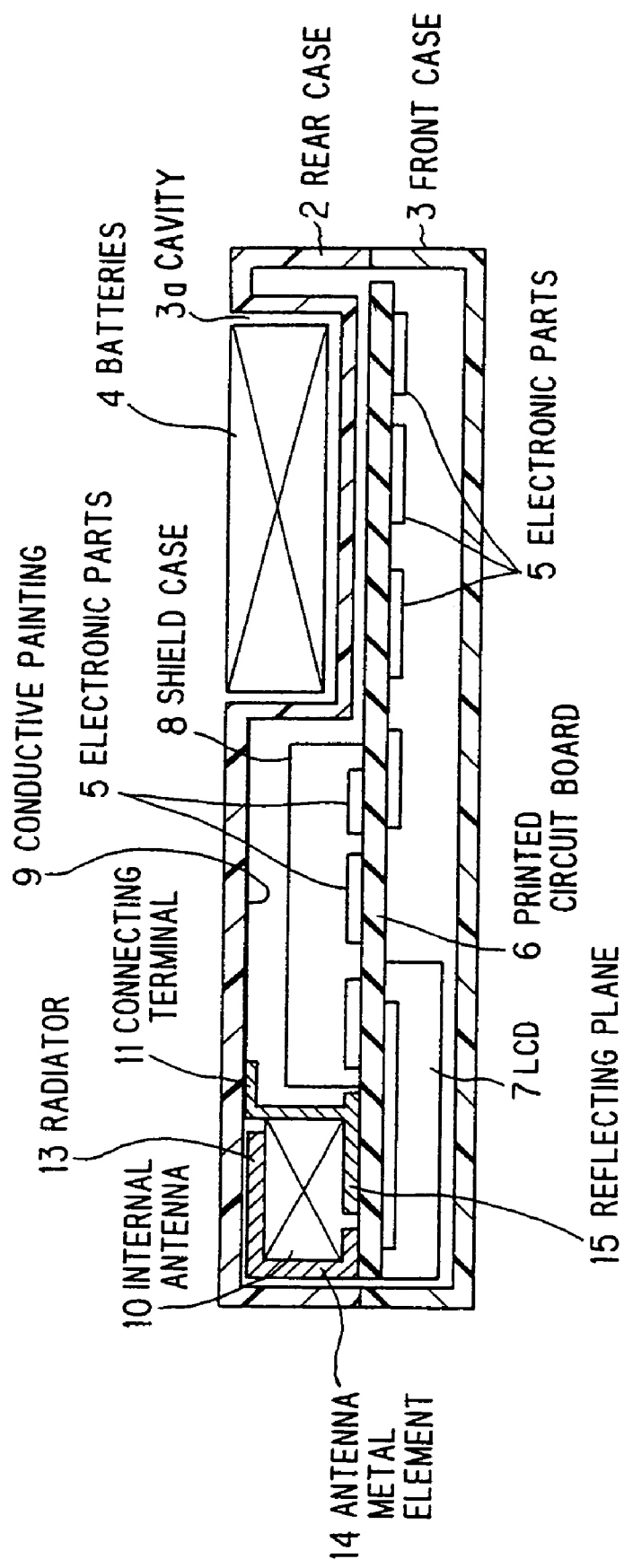
FIG. 2 is a cross-sectional view for showing a portable communication unit according to the first preferred embodiment of the invention.

FIG. 2 shows a portable communication unit according to the first preferred embodiment of the invention. A casing of the portable communication unit is separated into a rear case 2 and a front case 3, each of which is molded out of resin, and fits for the other to form one united body. A cavity 3a to be loaded with batteries 4 is formed on a surface of the rear case 2. A print circuit board 6 is situated between the rear case 2 and the front case 3, and electronic parts 5 are mounted on both the surfaces of the printed circuit board 6. Moreover, a liquid crystal display (LCD, hereinafter) 7 is mounted on a predetermined position of the printed circuit board 6. In addition to this, numerical keys and functional switches are situated on the predetermined positions of the front case 3, though graphical representations thereof are omitted. In the electronic parts 5, a radio unit composed of a transmitter and a receiver is covered with a metallic shield case 8 in order to suppress external noise and undesired radiation, and a predetermined portion of the shield case 8 is soldered to a grounding pattern of the printed circuit board 6. The internal antenna which is classified into a inverted F shaped antenna or a dielectric antenna is accommodated in a space formed between the rear case 2 and the printed circuit board 6. The internal antenna 10 is supported in a condition that it is inserted between the rear case 2 and the printed circuit board 6. A conductive painting 9 is so applied to an inner surface of the rear case 2 except an area covering the internal antenna that a portion of the conducting painting 9 is brought into contact with the grounding pattern of the printed circuit board 6. Conductive painting 9 is also brought into contact with connecting terminals 11 mentioned later.

Figure 3:
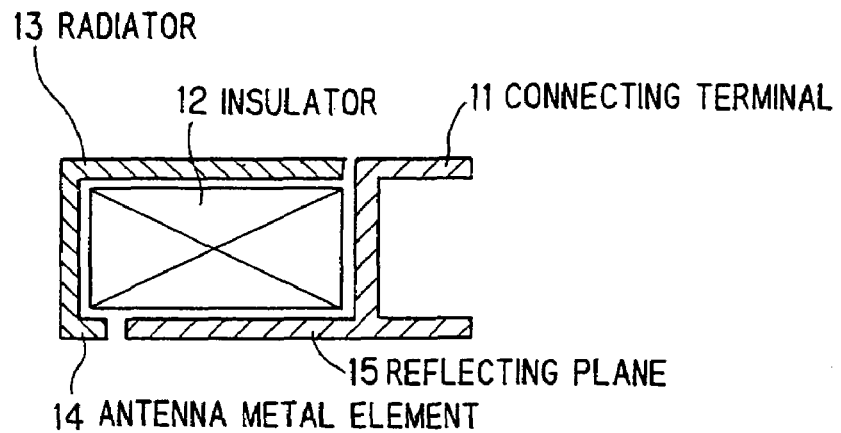
FIG. 3 is a cross-sectional view of an internal antenna used in the embodiments of the invention.

As mentioned in the above, the internal antenna 10 is either the inverted F shaped antenna or the dielectric antenna. FIG. 3 shows the structure of the internal antenna in detail. The internal antenna 10 serves as both the transmitting and receiving antennas. As shown in FIG. 3, the internal antenna 10 is composed of one or more connecting terminals 11 having a squarish U shaped cross-section, an insulator 12 serving as a spacer, a radiator 13 which is shaped into a plate shaped pattern or into a predetermined pattern and situated on a top surface of the insulator 12, an antenna metal element 14 which is situated on the side of the radiator 13 in a condition that it is connected with the radiator 13 and provided with a lower end which is brought into contact with a feeding terminal of the radio unit mounted on the printed circuit board 6, and a reflecting plate 15 which is opposite the radiator 13 and situated under the insulator 12. The reflecting plate 15 is connected with the lower end of the connecting terminals 11. The higher end of the connecting terminals 11 are brought into contact with the conductive painting 9 via contact surfaces therebetween. The lower end of the antenna metal element 14 is brought into contact with the feeding terminal of the radio unit mounted on the printed circuit board 6 via a contact surface therebetween. In each of the aforementioned contact surfaces between the structural elements, an contact resistance brought about therebetween can be sufficiently reduced by contact pressure exerted on the contact surface which is caused by the rear case 2 and the front case 3, each being fit for the other. The structural elements shown in FIG. 2 may be mounted on the printed circuit board 6 either individually or collectively by means of adhesive.

In the structures shown in FIGS. 2, 3, when the portable communication unit is communicating with the base station, a transmitting power outputted from the radio unit mounted on the printed circuit board 6 is supplied to the antenna metal element 14, and radiated from the radiator 13. The electric wave radiated from the radiator 13 in the direction of the insulator 12 is reflected by the reflecting plane 15, and radiated to the outside via the radiator 13. The reflecting plane 15 is connected with the grounding pattern (not shown) of the printed circuit board 6 and with the conductive painting 9 via the connecting terminals 11. Accordingly, since the reflecting plane 15, the conductive painting 9, and the grounding pattern of the printed circuit board 6 form a grounding plane having a wide area, and the portable communication unit can be connected with the ground stably. As a result, the shielding effect against the underired radiation can be heightened.

As mentioned in the above, according to the first preferred embodiment, since the internal antenna 10 is supported in a condition that it is inserted between the rear case 2 and the printed circuit board 6, the connecting terminals 11 are brought into contact with the conductive painting 9 serving as the grounding panel, and the antenna metal element 14 is brought into contact with the feeding terminal of the printed circuit board 6, there is no necessity for using a particular feeding system and a soldering technique. Accordingly, the space for accommodating the internal antenna 10 can be saved, and the number of the structural elements can be reduced. Moreover, since a single grounding plane having a wide area can be provided stably, the characteristic of the antenna can be stabilized. Since the potential of the reflecting plate 15 is at the ground level, the reflecting plane 15 is serves as a shielding surface against the undesired wave, and the shielding property thereof can be heightened.

The Second Preferred Embodiment

Figure 4:
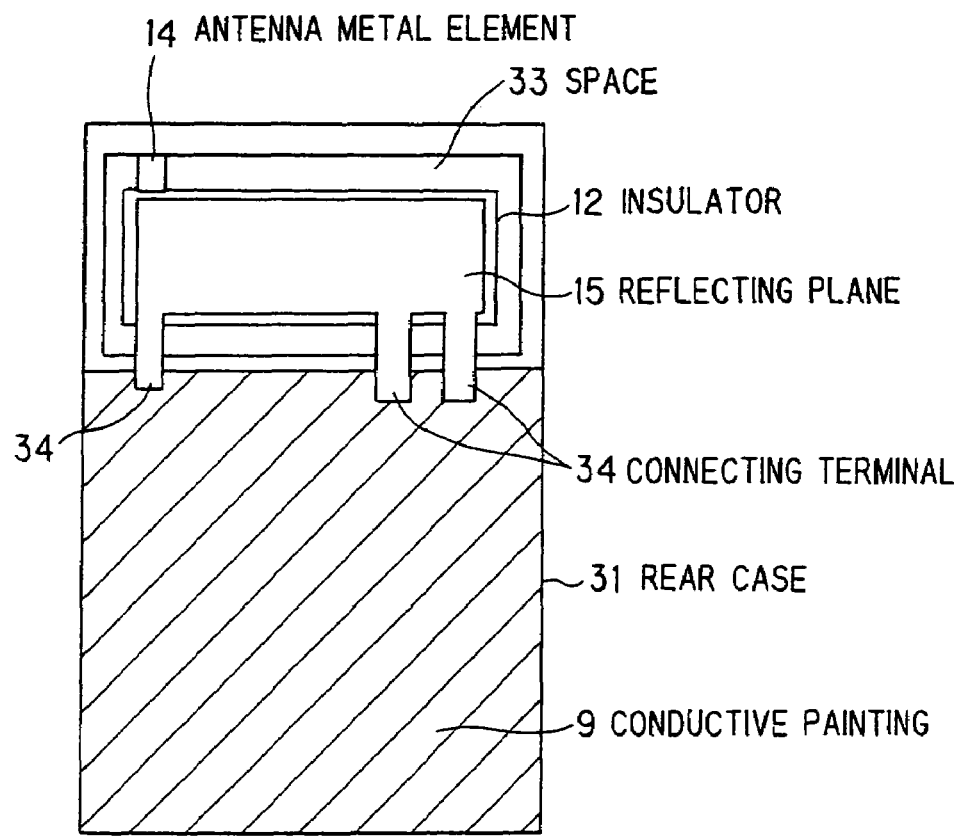
FIG. 4 is a plan view for showing a rear case of a portable communication unit according to the second preferred embodiment of the invention.
Figure 5:
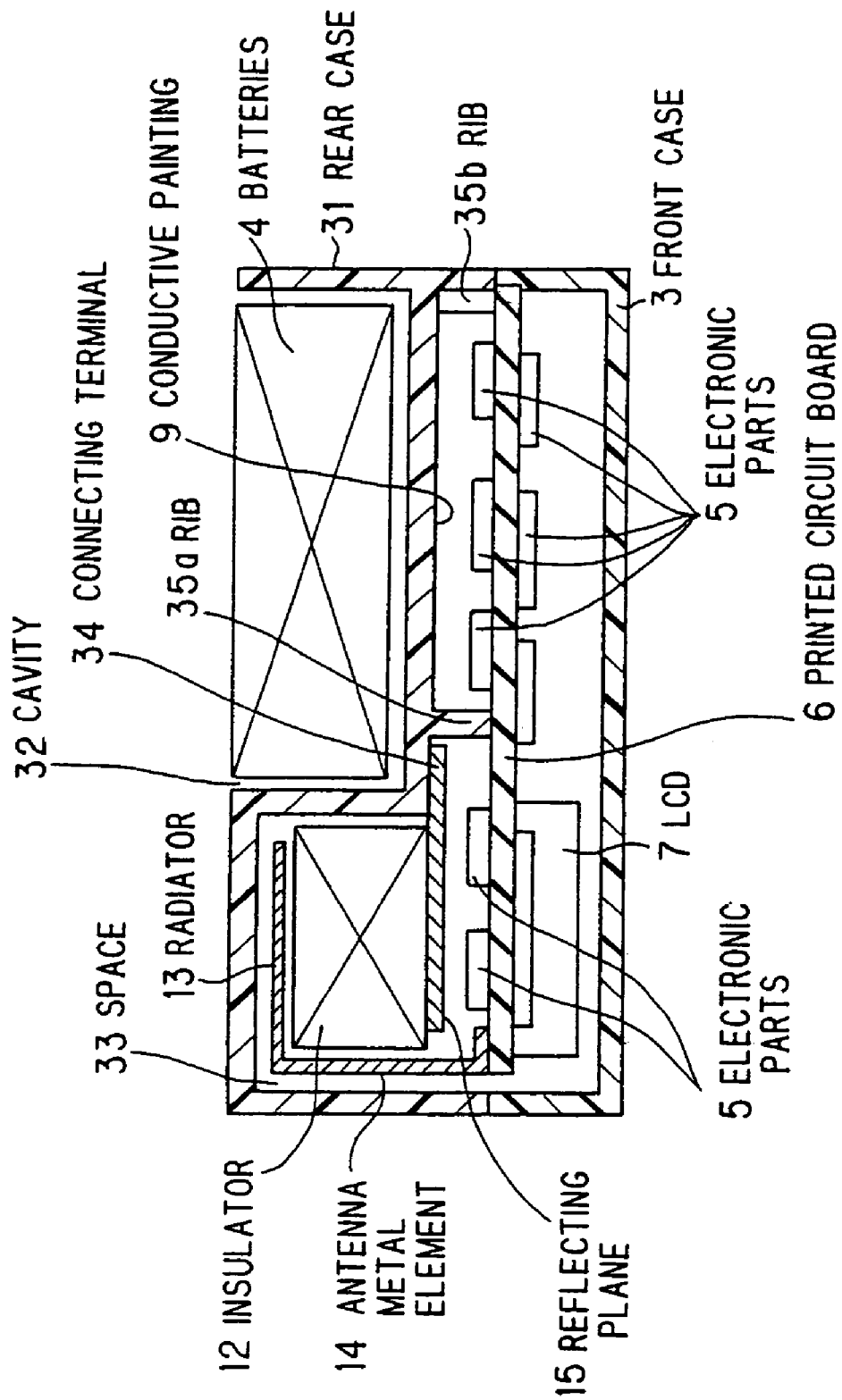
FIG. 5 is a cross-sectional view for showing a portable communication unit according to the second preferred embodiment of the invention.

FIGS. 4, 5 show the other portable communication unit according to the second preferred embodiment of the invention. FIG. 4 is a plan view for showing a rear case 31 and an internal antenna 10, and FIG. 5 is a cross-sectional view of the total structure. Through FIGS. 2 to 5, structural elements having the same functions are denoted by the same reference numerals, and the duplicated explanations will be omitted.

The feature of this embodiment consists in the configuration of the rear case 31. As shown in FIGS. 4, 5, the rear case 31 is provided with a cavity 32 to be loaded with batteries 4 and a space 33 for accommodating an internal antenna 10. It should be noted that shield case 8 which is shown in FIG. 2 is not provided for the rear case 31 in the second preferred embodiment. Although there is no difference in the structure of the front case 3 which accommodates the LCD 7 and the printed circuit board 6 between the first and second preferred embodiments, the conductive painting 9 is provided for the inner surface of the rear case 31 except the space 33 for accommodating the internal antenna 10 in the second preferred embodiment as shown in FIGS. 4, 5. Portions of the conductive painting 9 are brought into contact with the connecting terminals 34 which extend from the reflecting plane 15. Moreover, as shown in FIG. 5, ribs 35a, 35b are provided for the rear case 31 so that the position of the printed circuit board 6 relative to the rear case 31 can be adjusted and determined easily.

Next, a process of assembling the portable communication unit according to the second preferred embodiment will be explained.

As shown in FIG. 4, the rear case 31 is so set on a horizontal surface that the inner surface of the rear case 31 (the conductive painting 9) is directed upward, and the internal antenna 10 is inserted into the space 33. Next, leading end portion of the connecting terminals 34 are brought into contact with the conductive painting 9. In this way, the internal antenna 10 is accommodated in the space 33 and fixed to the rear case 31. Moreover, the feeding system (the antenna metal element 14) is established within a narrow space stably.

Next, after the LCD 7 and the printed circuit board 6 are fixed to the front case 3 as shown in FIG. 5, the front case 3 is fitted into the rear case 31. In this step, the printed circuit board 6 are fixed on the ribs 35a, 35b.

According to the aforementioned structure, the rear case 31 brings the reflecting plane 15, the connecting terminals 34, and the conductive painting 9 into contact with each other to form a stable grounding plane having a wide area. By providing the rib 35b for the rear case 31 and pressing the printed circuit board 6 against the aforementioned grounding plane, a part of the inner surface of the rear case which is coated with the conductive painting 9 serves as a shield case, and suppresses undesired electric waves radiated from the electronic parts 5, hence the shield case 8 which is indispensable in the first preferred embodiment shown in FIG. 2 becomes unnecessary. That is to say, the number of the structural elements can be reduced in the second preferred embodiment.

As mentioned in the above, according to the second preferred embodiment, since the internal antenna 10 is supported between the rear case 31 and the printed circuit board 6, the connecting terminals 34 are brought into contact with the conductive painting 9 serving as the grounding plane, and the antenna metal element 14 is brought into contact with the feeding terminal of the printed circuit board 6, there is no necessity for using a particular feeding system and soldering technique. Accordingly, the space 33 for accommodating the internal antenna 10 can be saved, and the number of the structural elements in the second preferred embodiment can be made smaller than that in the first preferred embodiment. Moreover, since a single grounding plane having a wide area can be provided stably, the efficiency of the antenna is heightened, and the fluctuation of the characteristic of the antenna can be suppressed. Furthermore, since the potential of the reflecting plane 15 is at the ground level, and the rear case 31 serves as a shield case against the undesired waves, the shielding property of the portable communication unit can be heightened.

Although the internal antenna serves as both the transmitting and receiving antennas in the first and second preferred embodiments, it is desirable to add a whip antenna etc. to the portable communication unit as an external antenna in order to improve the receiving characteristic thereof by the technology of the space diversity.

As seen from the above explanations, according to the portable communication unit according to the invention, since the internal antenna is accommodated in a space provided for the rear case, the internal antenna is supported between the rear case the printed circuit board, and the feeding point of the internal antenna is connected with the feeding terminal of the printed circuit board via the antenna metal element in which pressure is exerted on the contact surface therebetween, a soldering technique becomes unnecessary, and the fabricating process can be simplified. Moreover, since the feeding system using the leaf springs are not adopted, the space necessary for assembling the internal antenna can be saved, and the number of the structural elements can be reduced.

Since the internal antenna according to the invention is composed of the radiator, the reflecting plane combined with the radiator, the antenna metal element which is connected with the radiator at an output end thereof and brought into contact with the feeding terminal of the printed circuit board at an input end thereof, the conductive painting which is applied to an inner surface of the rear case and brought into contact with a grounding pattern of the printed circuit board, and the connecting terminals which connects an edge of the reflecting plane with the conductive painting via a contacting means, a soldering technique becomes unnecessary, a space for accommodating the internal antenna and accessories thereof can be saved, and the number of the structural elements can be reduced. Moreover, since the reflecting plane not only reflects the electric wave radiated from the radiator but also serves as a part of the grounding plane, the potential of the grounding plane can be stabilized, and the fluctuation of the characteristic of the antenna can be suppressed.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A portable communication unit comprising:
   a printed circuit board on which a radio unit comprising a transmitter and a receiver is mounted,
   a grounding pattern on the printed circuit board,
   an internal antenna which is an inverted F shaped antenna and which includes a reflecting plane connected with the grounding pattern,
   an antenna metal element having a first end and a second end, wherein the first end is directly connected with a feeding point of said internal antenna at an output end thereof, and the second end of the antenna metal element is brought into direct electrical contact with a feeding terminal formed on said printed circuit board at an input end thereof,
   a front case, and
   a rear case which is provided with a space for accommodating said internal antenna, and, wherein said internal antenna is supported between said rear case and said printed circuit board,
   wherein a conductive painting is applied to a predetermined region of an inner surface of said rear case, and brought into contact with the grounding pattern of said printed circuit board, and wherein said reflecting plane, said conductive painting, and said grounding pattern form a grounding plane, and the electrical contact between the antenna metal element and the feeding terminal of the printed circuit board is secured by pressure exerted on a contact surface therebetween.

2. The portable communication unit according to claim 1, wherein:
   said space in said rear case for accommodating said internal antenna is a cavity which is fit for said internal antenna.

3. The portable communication unit according to claim 1, wherein:
   said conductive painting is applied to a region which is opposite to said radio unit at least.

4. The portable communication unit according to claim 1, wherein the reflecting plane is a parasitic element that is driven solely by electromagnetic coupling with a driven element of the antenna.

5. The portable communication unit of claim 1, wherein the antenna metal element is held directly in contact with the feeding terminal formed on the printed circuit board by a solderless connection.

6. A portable communication unit comprising:
   a printed circuit board on which a radio unit comprising a transmitter and a receiver is mounted,
   a grounding pattern on the printed circuit board,
   an inverted F shaped internal antenna,
   an antenna metal element having a first end and a second end, wherein the first end is directly connected with a feeding point of said internal antenna at an output end thereof, and the second end of the antenna metal element is brought into direct electrical contact with a feeding terminal formed on said printed circuit board at an input end thereof, wherein the electrical contact between the antenna metal element and the feeding terminal of the printed circuit board is secured by pressure exerted on a contact surface therebetween,
   a front case,
   a rear case which is provided with a space for accommodating said internal antenna, wherein said internal antenna is supported between said rear case and said printed circuit board,
   a conductive painting is applied to a predetermined region of an inner surface of said rear case, and brought into contact with the grounding pattern of said printed circuit board,
   said internal antenna includes:
   a radiator which is situated inside said rear case and connected with said metal element,
   a reflecting plane which is situated opposite to said radiator maintaining a predetermined interval therebetween, and connected with the grounding pattern, and
   connecting terminals which connect an edge of said reflecting plane with said conductive painting.

7. An internal antenna of a portable communication unit which is accommodated in a casing comprising a front case and a rear case together with a printed circuit board, comprising:
   a radiator situated inside said rear case,
   an antenna metal element having a first end and a second end, wherein the first end is directly connected with said radiator at an output end thereof, and the second end of the antenna metal element is brought into direct electrical contact with a feeding terminal formed on said printed circuit board at an input end thereof, wherein the electrical contact between the antenna metal element and the feeding terminal of the printed circuit board is secured by pressure exerted on a contact surface therebetween,
   a reflecting plane which is situated opposite to said radiator maintaining a predetermined interval therebetween, and includes a reflector connected with a grounding pattern on the printed circuit board,
   a conductive painting which is applied to an inner surface of said rear case and brought into contact with a grounding pattern of said printed circuit board, wherein the reflecting plane, the conductive painting, and the grounding pattern form a grounding plane, and
   connecting terminals which connect an edge of said reflecting plane with said conductive painting via contacting means.

8. A portable communication unit comprising:
   a rear case,
   a printed circuit board including a grounding pattern and a feeding terminal,
   an internal antenna supported between said rear case and said printed circuit board, and including a reflecting plane connected with the grounding pattern, and
   an antenna metal element having a first end and a second end, wherein the first end is directly connected with said internal antenna, and the second end of the antenna metal element is in direct electrical contact with the feeding terminal on said printed circuit board,
   wherein a conductive painting is applied to a predetermined region of an inner surface of said rear case, and brought into contact with the grounding pattern of said printed circuit board, and wherein said reflecting plane, said conductive painting, and said grounding pattern form a grounding plane, and the electrical contact between the antenna metal element and the feeding terminal of the printed circuit board is secured by pressure exerted on a contact surface therebetween.

9. The portable communication unit according to claim 8, further comprising an insulator located between said internal antenna and said reflecting plane.

10. The portable communication unit according to claim 8, further comprising a connecting terminal connected with said reflecting plane and configured to extend said grounding pattern to the rear case.

11. The portable communication unit according to claim 10, wherein said conductive painting applied to said rear case is in contact with said connecting terminal.

12. An inverted F shaped internal antenna for a portable communication unit that includes a front case, a rear case, and a printed circuit board, the internal antenna comprising:

a radiator situated inside said rear case, an antenna metal element having a first end and a second end, wherein the first end is directly connected with said radiator, and the second end of the antenna metal element is in direct electrical contact with a feeding terminal on said printed circuit board and secured by pressure exerted on a contact surface therebetween, a reflecting plane connected with a grounding pattern on said printed circuit board, a connecting terminal connected with said reflecting plane, and a conductive painting applied to said rear case and in contact with the connecting terminal and brought into contact with the grounding pattern of said printed circuit board, and wherein said reflecting plane, said conductive painting, and said grounding pattern form a grounding plane.

* * * * *